United States Patent [19]

Salzer

[11] Patent Number: 4,709,258
[45] Date of Patent: Nov. 24, 1987

[54] CIRCUIT AND METHOD FOR ADDING GREEN SYNCHRONIZATION PULSE TO RED AND BLUE VIDEO SIGNALS

[75] Inventor: William E. Salzer, Gilbert, Ariz.
[73] Assignee: Motorola Inc., Schaumberg, Ill.
[21] Appl. No.: 911,857
[22] Filed: Sep. 26, 1986
[51] Int. Cl.[4] .......................... H04N 9/00; H04N 9/68; H04N 9/44
[52] U.S. Cl. .......................................... 358/27; 358/17
[58] Field of Search ................... 358/17, 34, 149, 151, 358/27

[56] References Cited

U.S. PATENT DOCUMENTS

| | | | |
|---|---|---|---|
| 3,651,248 | 3/1972 | Schneider | 358/34 |
| 3,715,462 | 2/1973 | Krause | 358/27 |
| 3,852,808 | 12/1974 | Sadashige | 358/27 |
| 4,030,120 | 6/1977 | Pam Van Cang | 358/34 |

FOREIGN PATENT DOCUMENTS 160386 9/1984 Japan ..................................... 358/27

Primary Examiner—John W. Shepperd
Attorney, Agent, or Firm—Dale Jepsen

[57] ABSTRACT

A synchronization separation circuit is used to separate the synchronization signal portion of a green video signal. This synchronization signal is used to enable first and second comparators which compare the synchronization portion of the green video signal with the synchronization portions of the red and blue video signals respectively. A differential amplifier for each of the red and blue video signals, enabled by the green synchronization pulse and driven by the appropriate comparator, produces a synchronization pulse identical to that of the green video signal which is then added to the red or blue video signal.

5 Claims, 2 Drawing Figures

1 COMPOSITE VIDEO (GREEN)

2 H SYNC

3 STROBE

4 COMPARATOR OUTPUT

5 PULSE ADDED TO RED AND BLUE VIDEO SIGNALS

CIRCUIT AND METHOD FOR ADDING GREEN SYNCHRONIZATION PULSE TO RED AND BLUE VIDEO SIGNALS

BACKGROUND OF THE INVENTION

The present invention relates in general to the field of high resolution fiber optic RGB video transmission. More particularly, the present invention relates to a circuit and method for detecting the synchronization signal on the green portion of a standard RBG video signal source and accurately adding this synchronization signal to the red and blue portions thereof.

Ordinarily, even high resolution RGB video signals can be successfully transmitted via coaxial cables to a color monitor over a short distance without significant degradation in the video display. However, when these high resolution video signals are transmitted over coaxial cables to a monitor at some remote location the video display begins to degrade when these distances exceed a certain value. In addition, RFI from the coaxial cables exceeds acceptable limits. This degradation begins to appear at distances greater than approximately 20 feet.

In order to allow these video signals to be transmitted at distances greater than 20 feet and/or eliminate objectionable RFI radiation, an analog fiber optic transmission system is employed. The separate red, green and blue signals are amplified using a system which employs an amplification of the signal at the receiving end which depends on the amplitude of the horizontal synchronization signal to restore the received signal to correct video levels. Since the amplification of the signal is based on the amplitude of the horizontal synchronization signal, the amplitude of the synchronization signal must be very accurate.

Amplification of the red and blue signals based solely on the amplitude of the horizontal synchronization signal portion of the green signal results in differential gain or improper color reproduction due to the different losses suffered through the separate fiber optic cables, connectors and components for the red, green and blue video signals.

SUMMARY OF THE INVENTION

It is therefore an object of the present invention to provide a method and circuit for adding the green synchronization pulse to the red and blue video signals.

It is a further object of the present invention to very accurately add the horizontal synchronization portion of a green video signal to the red and blue video signals in order to allow accurate amplification of each in a system wherein the amplification is based upon the amplitude of the horizontal synchronization signal.

It is still further an object the present invention to provide a relatively simple circuit utilizing a few standard components in order to accomplish the accurate addition of the green horizontal synchronization signal to the red and blue video signals.

The foregoing and other objects are achieved by the present invention wherein there is provided a synchronization pulse addition circuit which comprises a first PNP transistor, the base of which is coupled to a green video signal input terminal and the emitter of which is coupled to a first source of supply voltage, to the collector of a first NPN transistor and to the input terminal of a one shot. The base and emitter of the first NPN transistor and the base and collector of the first PNP transistor are coupled to a ground reference. The collector of the first PNP transistor is coupled to the base of the first NPN transistor. The enable terminals of first and second comparators are coupled to the output terminal of the one shot. The first and second input terminals of the first and second comparators are coupled to the ground reference via first, second, third and fourth diodes, the anode terminals of which are coupled to the ground reference. The first input terminals of the first and second comparators are coupled to the green video signal input terminal. The second input terminal of the first comparator is coupled to a red video signal input terminal and the second input terminal of the second comparator is coupled to a blue video signal input terminal.

The output terminal of the first comparator is coupled to the cathode of a first zener diode, the anode of which is coupled to the anode of a fifth diode, the cathode of which is coupled to the base terminal of a second NPN transistor. The emitter of the second NPN transistor is coupled to the emitter of a third NPN transistor, the collector of which is coupled to a ground reference and the base of which is coupled to the anode of a second zener diode, the cathode of which is coupled to the input terminal of the one shot. The collector of the second NPN transistor is coupled to the red video signal input terminal. The base and emitter of the second and third NPN transistors, as well as the anode of the fifth diode, are coupled to a negative voltage reference.

The output terminal of the second comparator is coupled to the cathode of a third zener diode, the anode of which is coupled to the anode of a sixth diode, the cathode of which is coupled to the base of a fourth NPN transistor. The emitter of the fourth NPN transistor is coupled to the emitter of a fifth NPN transistor, the collector of which is coupled to the ground reference and the base of which is coupled to the base of the third NPN transistor. The base and emitter of the fourth and fifth NPN transistors, as well as the anode of the sixth diode, are coupled to the negative voltage reference. The collector of the fourth NPN transistor is coupled to the blue video signal input terminal.

BRIEF DESCRIPTION OF THE DRAWINGS

The above mentioned and other features and objects of the present invention and the manner of attaining them will become more apparent and the invention itself will be best understood by reference to the following description of an embodiment of the invention taken into conjunction with the accompanying drawings wherein.

DESCRIPTION OF A PREFERRED EMBODIMENT

Figure 1:
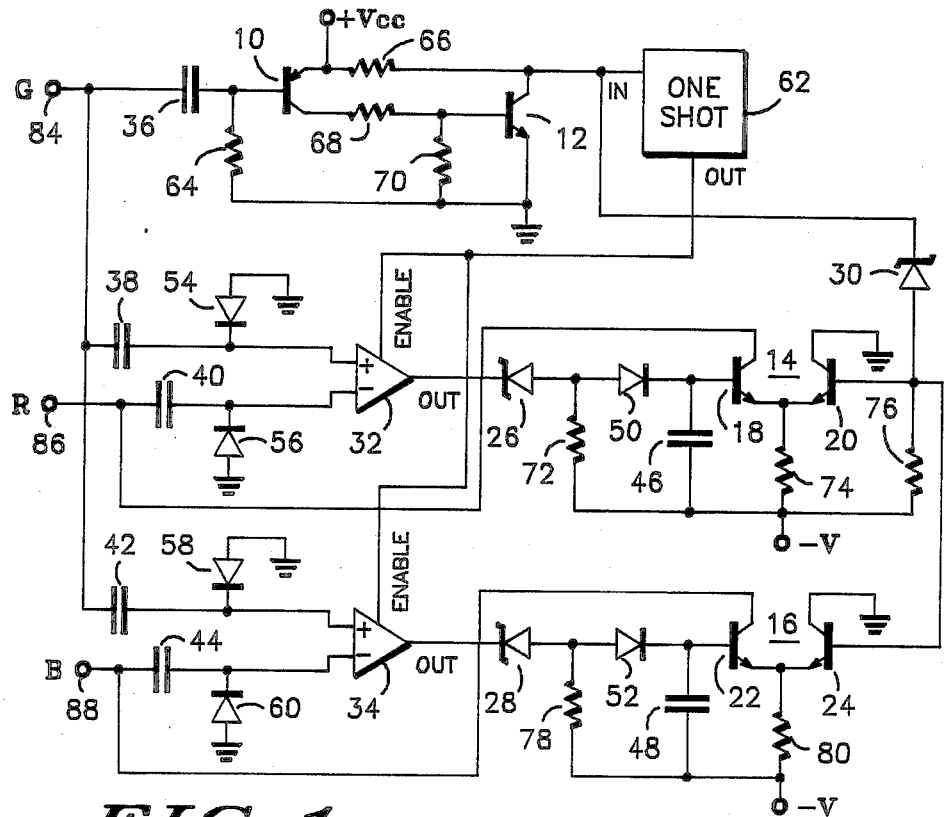
FIG. 1 is a schematic and block diagram representation of a specific embodiment of the present invention.

Referring now to FIG. 1 there is shown a schematic diagram of the circuit of the present invention which comprises a first input capacitor 36 having first and second terminals the first terminal of which is coupled to green input terminal 84 for receiving a green video signal and the second terminal of which is coupled to the base of PNP transistor 10 and to the first terminal of resistor 64. The emitter of PNP transistor 10 is coupled to a positive source of supply voltage and to the first terminal of resistor 66. The collector of PNP transistor 10 is coupled to the first terminal of resistor 68, the second terminal of which is coupled to the base terminal of NPN transistor 12 and to the first terminal of resistor 70. The second terminal of resistors 64 and 70 and the emitter of transistor 12 are coupled to a ground reference. The second terminal of resistor 66 is coupled to the collector of NPN transistor 12 and to the input terminal of one shot 62. The input terminal of one shot 62 is also coupled to the cathode of zener diode 30, the anode of which is coupled to the base terminal of NPN transistor 20, to the base terminal of NPN transistor 24 and to the first terminal of resistor 76. The output terminal of one shot 62 is coupled to the enable terminal of comparator 32 and to the enable terminal of comparator 34.

The first terminal of capacitor 38 is coupled to the first terminal of capacitor 36 and the second terminal of capacitor 38 is coupled to the cathode of diode 54 and to the positive input of comparator 32. The first terminal of capacitor 40 is coupled to red terminal 86 for receiving a red video signal and the second terminal of capacitor 40 is coupled to the cathode of diode 56 and the negative input terminal of comparator 32. The anode terminals of diodes 54 and 56 are coupled to the ground reference. The output terminal of comparator 32 is coupled to the cathode terminal of zener diode 26, the anode terminal of which is coupled to the anode terminal of diode 50 and a first terminal of resistor 72. The cathode terminal of diode 50 is coupled to the base terminal of NPN transistor 18 and a first terminal of capacitor 46. The collector terminal of NPN transistor 18 is coupled to red input terminal 86. The collector terminal of NPN transistor 20 is coupled to a ground reference and the emitter terminals of transistors 18 and 20 are coupled to the first terminal of resistor 74. The second terminals of resistor 72, capacitor 46, resistor 74 and resistor 76 are coupled to a negative voltage reference.

The first terminal of capacitor 42 is coupled to the first terminal of capacitor 36 and the second terminal of capacitor 42 is coupled to the cathode of diode 58 and to the positive input of comparator 34. The first terminal of capacitor 44 is coupled to blue input terminal 88 for receiving a blue video signal. The second terminal of capacitor 44 is coupled to the cathode of diode 60 and the negative input terminal of comparator 34. The anode terminals of diodes 58 and 60 are coupled to a ground reference. The output terminal of comparator 34 is coupled to the cathode of zener diode 28, the anode of which is coupled to the anode of diode 52 and the first terminal of resistor 78. The cathode of diode 52 is coupled to the first terminal of capacitor 48 and the base terminal of NPN transistor 22. The collector of NPN transistor 22 is coupled to blue input terminal 88 while the collector of NPN transistor 24 is coupled to a ground reference. The emitters of transistors 22 and 24 are coupled to the first terminal of resistor 80. The second terminals of resistor 78, capacitor 48 and resistor 80 are coupled to the negative voltage reference.

Figure 2:
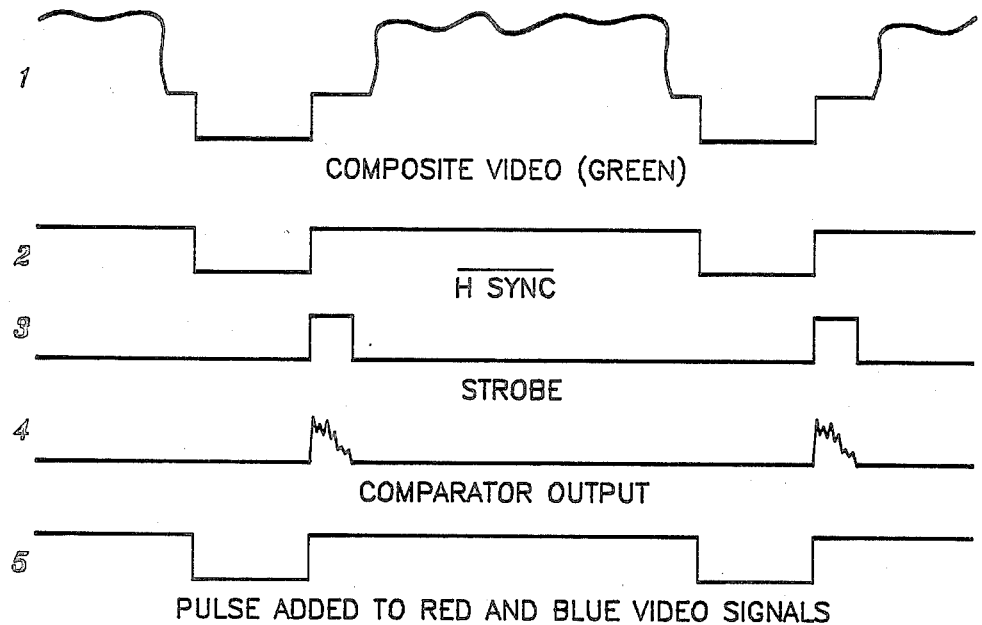
FIG. 2 is a diagram illustrating various wave forms at various portions in the circuit of FIG. 1.

In operation the composite green video signal, as shown in wave form one of FIG. 2, is input to the circuit at terminal 84 and via capacitor 36 to transistor 10 which acts as a synchronization separator to remove an invert only the synchronization pulse portion of the green composite video signal. Transistor 12 acts to reinvert the separated synchronization signal and applies same to one shot 62 and to the cathode of zener diode 30. The output of one shot 62 is an enable signal, as shown in wave form 3 of FIG. 2, which is applied to the enable terminals of comparators 32 and 34.

Differential amplifier 14 (and 16) is enabled only during the synchronization pulse via transistor 12 and zener diode 30. Zener diode 30 is always biased on via a DC current path through resistors 66 and 76 and serves to level shift the output of transistor 12. During the synchronization pulse when transistor 12 is on, that is the output is near ground, zener diode 30 shifts this near-ground-level signal to a signal more negative than the base of transistor 18 (and 22) allowing transistor 18 (and 22) to turn on only during the horizontal synchronization pulse.

Comparator 32 serves to compare the synchronization pulse portions of the green composite signal applied via capacitor 38 and the red composite signal applied via capacitor 40. The difference between these two pulse signals will be applied during the enable portion of wave form 3, via zener diode 26 and diode 50, to charge capacitor 46. During the next cycle, when differential amplifier 14 is enabled, as described above a current proportional to the difference between the red and green pulse signals as represented by the charge on capacitor 46 will turn transistor 18 on harder and thereby pull more current from red terminal 86 until the synchronization pulse portions of the red and green composite signals are virtually equal. A similar comparison is made in comparator 34 between the composite green signal via capacitor 42 and the composite blue signal via capacitor 44. The resultant synchronization pulse signal, as shown in wave form 5 of FIG. 2, is added to the red composite signal on terminal 86 and the blue composite signal on terminal 88. Comparators 32 and 34 therefore act to compare the synchronization pulse portion of the composite green video signal with the synchronization pulse portions of the composite red and blue video signals and supply current as required to force the pulse portions of the red and blue signals to match that of the green composite video signal. Since the pulse portions of the composite video signals are now very accurately matched, any amplification which is based on the amplitude of this pulse portion of the composite video signal will be very closely matched between the green, red and blue video signals and the color intensities preserved over very long distance transmissions.

What has been provided therefor is a circuit and method for detecting the horizontal synchronization pulse portion of a green composite video signal and very accurately adding this same pulse portion of the video green signal to the corresponding red and blue signals of a high resolution video signal for transmission on fiber optic cables. The circuit and method of the present invention are implemented using common circuit elements and represent a relatively simple solution to the problem of preserving the relative intensities of the red, green and blue composite video signals during transmission over large distances via fiber optic cables.

While there have been described above the principles of the invention in conjunction with specific apparatus, it is to be clearly understood that these descriptions are made only by way of example and not as a limitation to the scope of the invention.

What is claimed is:

1. A synchronization pulse addition circuit comprising:

synchronization separator means, for coupling to a first video signal having a synchronization pulse portion thereof and for detecting said synchronization pulse portion of said first video signal;

one-shot means coupled to said synchronization separator means;

first comparator means, for coupling to said first video signal and to a second video signal and coupled to said one-shot means, for comparing the synchronization pulse portions of said first video signal and said second video signal;

second comparator means, for coupling to said first video signal and to a third video signal and coupled to said one-shot means, for comparing the synchronization pulse portions of said first video signal and said third video signal;

first amplifier means, coupled to said synchronization separator means and said first comparator means, for adding the synchronization pulse portion of said first video signal to said second video signal; and second amplifier means, coupled to said synchronization separator means and said second comparator means, for adding the synchronization pulse portion of said first video signal to said third video signal.

2. The circuit of claim 1 wherein said synchronization separator means further comprises:

a first transistor having first and second terminals and a control terminal, said control terminal of said first transistor for coupling to said first video signal and said first terminal of said first transistor coupled to a first voltage reference; and a second transistor having first and second terminals and a control terminal, said control terminal of said second transistor coupled to said second terminal of said first transistor, said first terminal of said second transistor coupled to said first terminal of said first transistor and said second terminal of said second transistor coupled to a second voltage reference.

3. The circuit of claim 1 wherein said first comparator means comprises a first amplifier having positive and negative input terminals, an enable terminal and an output terminal and said second comparator means comprises a second amplifier having positive and negative input terminals, an enable terminal and an output terminal.

4. A method for adding the synchronization pulse portion of a first video signal having a synchronization pulse portion thereof to second and third video signals comprising the steps of:

separating the synchronization pulse portion of said first video signal from said first video signal;

comparing the synchronization pulse portions of said first and second video signals;

comparing the synchronization pulse portions of said first and third video signals;

adding to said second video signal, a synchronization pulse of amplitude and duration equal to that of the synchronization pulse of said first video signal based on the difference between the synchronization pulse portions of said first and second video signals as measured during said comparison thereof;

adding to said third video signal, a synchronization pulse of amplitude and duration equal to that of the synchronization pulse of said first video signal based on the difference between the synchronization pulse portions of said first and third video signals as measured during said comparison thereof.

5. A synchronization pulse addition circuit comprising:

synchronization separator means having an input and output terminal, said input terminal for coupling to a first composite video signal;

a one-shot having input and output terminals, said input terminal of said one-shot coupled to said output terminal of said synchronization separator means;

a first comparator having first and second input terminals, an output terminal and an enable terminal, said first input terminal of said first comparator for coupling to said first composite video signal, said second input terminal of said first comparator for coupling to a second composite video signal, and said enable terminal of said first comparator coupled to said output terminal of said one shot;

a second comparator having first and second input terminals, an output terminal and an enable terminal, said first input terminal of said second comparator for coupling to said first composite video signal, said second input terminal of said second comparator for coupling to a third composite video signal, and said enable terminal of said second comparator coupled to said output terminal of said one-shot;

a first differential amplifier having input, output and enable terminals, said input terminal of said first differential amplifier coupled to said output terminal of said first comparator, said enable terminal of said first differential amplifier coupled to said output terminal of said synchronization separator means, and said output terminal of said first differential amplifier for coupling to said second composite video signal; and a second differential amplifier having input, output and enable terminals, said input terminal of said second differential amplifier coupled to said output terminal of said second comparator, said enable terminal of said second differential amplifier coupled to said output terminal of said synchronization separator means, and said output terminal of said second differential amplifier for coupling to said third composite video signal.

* * * * *